J. B. Cornell.
Street Gutters.
No. 596
Reissued Sept 1, 1858
Fig 1
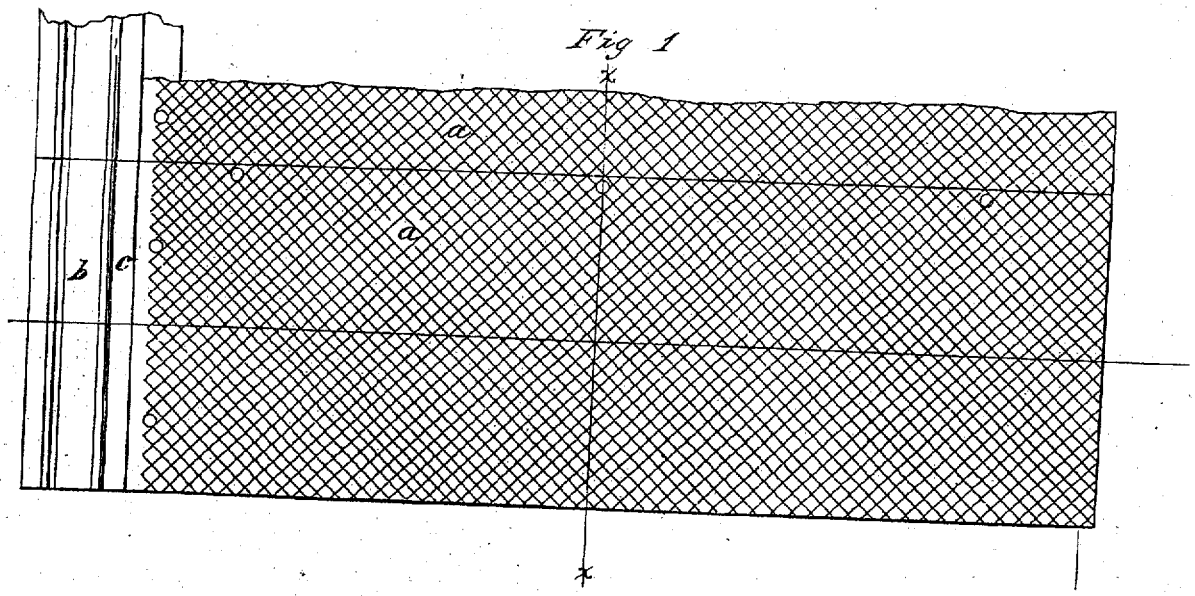
Fig. 2.
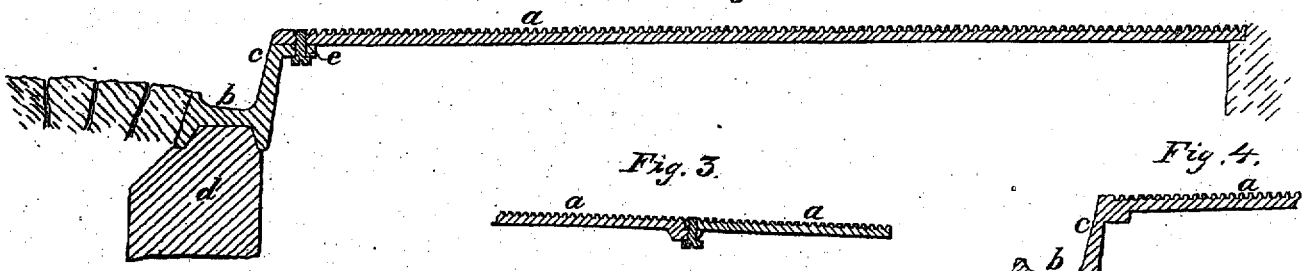
Fig. 3.
Fig. 4.
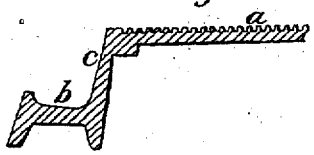

UNITED STATES PATENT OFFICE.

JOHN B. CORNELL, OF NEW YORK, N. Y.

IMPROVED SIDEWALK-PAVEMENT.

Specification forming part of Letters Patent No. 17,138, dated April 28, 1857; Reissue No. 596, dated September 7, 1858.

*To all whom it may concern:*

Be it known that I, JOHN B. CORNELL, of the city, county, and State of New York, have invented a continuously united metallic street-gutter, street-curb, and street sidewalk-pavement, which can be used to great advantage as a covering for the exposed upper portion of a substreet apartment; and I do hereby declare that the following is a full and exact description thereof, reference being had to the accompanying drawings making a part of this specification.

My invention consists in making sections of a street-gutter, *b*, a street-curb, *c*, and a sidewalk-pavement, *a*, all of iron, and in such a manner as to form a perfect union between the said sections, either by molding and casting them all in one piece in the form of a continuous transverse section, as shown in Fig. 7, or by molding and casting the said sections *a b c* separately, or partially so, and then uniting the same to each other by suitable joints, substantially as represented in the accompanying drawings.

Figures 1 and 2 of the accompanying drawings represent a suitable shape and thickness for the oblong plates *a a* which form a portion of my new combination of a section of a sidewalk-pavement with a section, *c*, of street-curbing and a section, *b*, of street-gutter. Fig. 2 is a sectional representation of a portion of street-gutter, *b*, and street-curbing *c*, cast in one piece with each other and then combined with a section, *a*, of sidewalk-pavement plate by means of an inwardly-projecting perforated lip from the upper end of the said street-curbing and a set screw passing from within through the perforation in the said lip into a screw-aperature in the end of the said pavement-plate. Fig. 3 is a sectional representation of a sidewalk-pavement plate, *a*, cast in one piece with a section, *c*, of street-curbing, and then the latter bolted to a flange, *e*, which rises from the upper surface of a section, *b*, of street-guttering. Fig. 4 is a sectional representation of a piece of street-guttering, which is of the same shape substantially as that represented in Fig. 3, and which is combined with one extremity of a separately cast angular curb-piece, *c*, while the opposite end of said curb-piece is combined with a separately cast sidewalk-pavement plate. Figs. 5 and 6 are modifications of the parts represented in Fig. 4, which parts may be united to each other by means of a suitable number of screws or rivets in substantially the manner shown in the drawings. Fig. 7 is a sectional representation of a sidewalk-pavement plate, *a*, a street-gutter, *c*, and a street-curb, *b*, all cast in one piece with each other. Fig. 8 is a section in the line *x x* of Fig. 1, and which clearly represents a suitable manner of uniting the edges of the sidewalk-plates *a a* to each other.

The shoulder which projects from the under surface of the edge of each sidewalk-plate *a* and receives the edge of the adjoining plate may have a groove formed in its upper surface for the purpose of conducting off any water that may pass down between said plates, or for the reception of any suitable water-proof cementing substance for producing a safer and more perfect union between the edges of said plates. The inner ends of the sidewalk-plates *a a* may be supported in any suitable manner. Flanges may be cast upon the under surfaces of the said plates *a a*, for the purpose of giving them any desired degree of strength and stiffness. The under surface of each section *b* of guttering should be of such a shape that it can be made to firmly and securely embrace the top of the wall *d*, which forms the outer boundary of the apartment which is to be covered by the sidewalk-sections *a a* in the aforesaid combination.

Apartments under street-sidewalks which are covered by my improved combination of sectional plates *a a*, curb-sections *c c*, and gutter-sections *b b*, are much more perfectly protected from the entrance of moisture from above or from the street than similar apartments which are covered in the usual manner, and my improved covering for substreet apartments also adds about two feet to the height of the ceiling when compared with other methods of covering such apartments.

What I claim as my invention, and desire to secure by Letters Patent, is—

1. Giving such a shape to the within-described street-gutter section *b* that its under surface will securely embrace the top of the wall *d*, while its upper surface at the same time forms a portion of the street-gutter, and also a firm supporting-base for a section, *c*, of street-curbing or its equivalent, substantially as represented in the accompanying drawings and herein set forth.

2. Forming a sidewalk-pavement of a series of metallic plates, *a a*, when the said plates are combined with or form portions of sections of metallic street-curbing, substantially as herein set forth.

JOHN B. CORNELL.

Witnesses:
BIRDSALL CORNELL,
A. A. JAYNE.